United States Patent
Nakamoto et al.

(10) Patent No.: US 12,391,558 B2
(45) Date of Patent: Aug. 19, 2025

(54) SILICON-CONTAINING FILM FORMING COMPOSITION AND METHOD FOR MANUFACTURING SILICON-CONTAINING FILM USING THE SAME

(71) Applicant: MERCK PERFORMANCE MATERIALS MANUFACTURING G.K., Tokyo (JP)

(72) Inventors: Naoko Nakamoto, Kakegawa (JP); Hideyuki Takagishi, Kakegawa (JP); Takashi Fujiwara, Kakegawa (JP); Atsuhiko Sato, Kakegawa (JP)

(73) Assignee: Merck Patent GmbH, Darmstadt (DE)

( * ) Notice: Subject to any disclaimer, the term of this patent is extended or adjusted under 35 U.S.C. 154(b) by 25 days.

(21) Appl. No.: 18/292,415

(22) PCT Filed: Jul. 26, 2022

(86) PCT No.: PCT/EP2022/070869
§ 371 (c)(1),
(2) Date: Jan. 26, 2024

(87) PCT Pub. No.: WO2023/006706
PCT Pub. Date: Feb. 2, 2023

(65) Prior Publication Data
US 2024/0262697 A1   Aug. 8, 2024

(30) Foreign Application Priority Data

Jul. 29, 2021   (JP) .................................. 2021-124386

(51) Int. Cl.
*C01B 33/04*   (2006.01)
(52) U.S. Cl.
CPC .................................. *C01B 33/04* (2013.01)

(58) Field of Classification Search
CPC .... C01B 33/04; C08K 5/5465; C09D 183/16; C08G 77/60
USPC .............................................. 528/28; 556/430
See application file for complete search history.

(56) References Cited

U.S. PATENT DOCUMENTS

2009/0156775 A1 *   6/2009   Sakamoto .............. C08G 77/60
528/30

FOREIGN PATENT DOCUMENTS

CN   110723973 A   1/2020

OTHER PUBLICATIONS

International Search Report and Written Opinion received for PCT Patent Application No. PCT/EP2022/070869, mailed on Nov. 30, 2022, 7 pages.

* cited by examiner

*Primary Examiner* — William P Fletcher, III
(74) *Attorney, Agent, or Firm* — Faegre Drinker Biddle & Reath LLP

(57) ABSTRACT

[Problem] According to the present invention, a silicon-containing film forming composition having a high affinity for a substrate can be provided. [Means for Solution] A silicon-containing film forming composition comprising (I) a polymer having a polysilane skeleton comprising a particular repeating unit. (II) a carbodiimide compound having a particular structure, and (III) a solvent.

17 Claims, No Drawings

SILICON-CONTAINING FILM FORMING COMPOSITION AND METHOD FOR MANUFACTURING SILICON-CONTAINING FILM USING THE SAME

CROSS-REFERENCE TO RELATED APPLICATIONS

This application is a National stage application (under 35 U.S.C. § 371) of PCT/EP2022/070869, filed Jul. 26, 2022, which claims benefit of Japanese Application No. 2021-124386, filed Jul. 29, 2021, both of which are incorporated herein by reference in their entirety.

BACKGROUND OF THE INVENTION

Technical Field

The present invention relates to a silicon-containing film forming composition and a method for manufacturing a silicon-containing film using the same.

Background Art

Electronic devices, particularly semiconductor devices, are composed of thin films such as semiconductor films, insulating films and conductive films. The silicon-containing film is used as a semiconductor film, as an etching mask during processing an insulating film, and as a sacrificial film during manufacturing a metal gate and the like.

As the method for forming an amorphous silicon film or a polycrystalline silicon film, a chemical vapor deposition method (CVD method), a vapor deposition method, a sputtering method, or the like has been used. At an advanced node, if a vapor phase process such as CVD is used, excessive growth is caused in a narrow trench, and etching and CVD need to be repeated. Therefore, it has been studied to form a film by applying a liquid composition comprising a silicon-containing polymer and baking it.

Polysilane, such as hydrogenated polysilane, is known as the silicon-containing polymer, but the liquid composition containing the hydrogenated polysilane has a low affinity for a substrate, and the cases in which a film can be formed using the hydrogenated polysilane are extremely limited.

In order to add functionality to polysilane, studies to introduce a specific functional group has been conducted. For example, Patent Document 1 discloses that a compound capable of hydrosilylation is added to polysilane to improve the solubility in various solvents.

PRIOR ART DOCUMENTS

Patent Documents

[Patent Document 1] US2009/0156775 A1

SUMMARY OF THE INVENTION

Problems to be Solved by the Invention

The present invention has been made based on the background technology as described above, and provides a silicon-containing film forming composition having a high affinity for a substrate.

Means for Solving the Problems

The silicon-containing film forming composition according to the present invention comprises:

(I) a polymer having a polysilane skeleton comprising a repeating unit represented by the formula (ia):

wherein
R$^a$ is each independently a single bond, hydrogen, halogen, C$_{1-6}$ alkyl, C$_{6-10}$ aryl or —SiR$^A_3$ (where R$^A$ is each independently hydrogen or C$_{1-8}$ alkyl), and
p is an integer of 5 or more;
(II) a carbodiimide compound represented by the formula (ii):

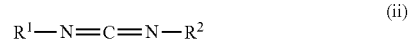

wherein
R$^1$ and R$^2$ are each independently hydrogen, a mono- to trivalent, C$_{1-30}$, linear, branched or cyclic, saturated or unsaturated aliphatic hydrocarbon group, a mono- to trivalent, C$_{6-30}$ aromatic hydrocarbon group, or —SiR$^z_3$ (where R$^z$ is each independently a mono- or divalent, C$_{1-8}$ aliphatic hydrocarbon group), where R$^1$ and R$^2$ can be bonded each other to form a ring structure; and
(III) a solvent.

The method for manufacturing a silicon-containing film according to the present invention comprises: applying the above-mentioned silicon-containing film forming composition above a substrate to form a coating film, and heating the coating film.

The method for manufacturing an electronic device according to the present invention comprises the above-mentioned method for manufacturing a silicon-containing film.

Effects of the Invention

The silicon-containing film forming composition according to the present invention has a high affinity for a substrate, and has good coatability and adhesion to the substrate. The silicon-containing film formed using the composition according to the present invention has high planarity and can reduce the relative diffuse reflectance. When the silicon-containing film forming composition according to the present invention is used, the film shrinkage can be reduced during the formation of a silicon-containing film.

DETAILED DESCRIPTION OF THE INVENTION

Mode for Carrying Out the Invention

Definition

Unless otherwise specified in the present specification, the definitions and examples described in this paragraph are followed.

The singular form includes the plural form and "one" or "that" means "at least one". An element of a concept can be expressed by a plurality of species, and when the amount (for example, mass % or mol %) is described, it means sum of the plurality of species.

"And/or" includes a combination of all elements and also includes single use of the element.

When a numerical range is indicated using "to" or "-", it includes both endpoints and units thereof are common. For example, 5 to 25 mol % means 5 mol % or more and 25 mol % or less.

The alkyl means a group obtained by removing any one hydrogen from a linear, branched or cyclic saturated hydrocarbon, and it includes a linear alkyl, branched alkyl and cyclic alkyl, and the cyclic structure contains a linear or branched alkyl as a side chain, if necessary. The aryl means a group obtained by removing any one hydrogen from an aromatic hydrocarbon.

The descriptions such as "$C_{x-y}$", "$C_x$-$C_y$" and "$C_x$" mean the number of carbons in a molecule or substituent. For example, $C_{1-6}$ alkyl means an alkyl chain having 1 or more and 6 or less carbons (methyl, ethyl, propyl, butyl, pentyl, hexyl etc.).

When a polymer has a plural types of repeating units, these repeating units copolymerize. These copolymerization may be any of alternating copolymerization, random copolymerization, block copolymerization, graft copolymerization, or a mixture thereof. When a polymer or resin is represented by a structural formula, n, m or the like that is attached next to parentheses indicate the number of repetitions.

Celsius is used as the temperature unit. For example, 20 degrees means 20 degrees Celsius.

The additive refers to a compound itself having a function thereof (for example, in the case of a base generator, a compound itself that generates a base). An embodiment in which the compound is dissolved or dispersed in a solvent and added to a composition is also possible. As one embodiment of the present invention, it is preferable that such a solvent is contained in the composition according to the present invention as the solvent (III) or another component.

Hereinafter, embodiments of the present invention are described in detail.

<Silicon-Containing Film Forming Composition>

The silicon-containing film forming composition according to the present invention (hereinafter, sometimes referred to as the composition) comprises (I) a polymer having a polysilane skeleton having a particular structure, (II) a carbodiimide compound having a particular structure, and (III) a solvent.

(I) Polymer Having a Polysilane Skeleton

The composition according to the present invention comprises a polymer having a polysilane skeleton comprising a repeating unit represented by the formula (ia) (hereinafter, sometimes referred to as the polymer having a polysilane skeleton, or the polymer).

The formula (ia) is as follows:

wherein $R^a$ is each independently a single bond, hydrogen, halogen, $C_{1-6}$ alkyl, $C_{6-10}$ aryl or —$SiR^A{}_3$, preferably a single bond, hydrogen or —$SiR^A{}_3$, and more preferably hydrogen. When $R^a$ is a single bond, it is bonded to a single bond in another repeating unit represented by the formula (ia) or a repeating unit represented by the formula (ib) in the polymer, and directly combines each silicon to which they are bonded.

$R^A$ is each independently hydrogen or $C_{1-8}$ alkyl, preferably hydrogen or methyl, and more preferably hydrogen.

p is an integer of 5 or more, preferably 5 to 20, and more preferably 6 to 10.

The polymer having a polysilane skeleton used in the present invention preferably further comprises a repeating unit represented by the formula (ib).

The formula (ib) is as follows:

wherein $R^b$ is each independently a single bond, hydrogen, halogen, $C_{1-6}$ alkyl, $C_{6-10}$ aryl or —$SiR^B{}_3$, preferably single bond, hydrogen or —$SiR^B{}_3$, and more preferably hydrogen or a single bond, provided that at least one of $R^b$ is a single bond. When $R^b$ is a single bond, it is bonded to a single bond in another repeating unit represented by the formula (ib) or a repeating unit represented by the formula (ia) in the polymer, and directly combines each silicon to which they are bonded.

$R^B$ is each independently hydrogen or $C_{1-8}$ alkyl, preferably hydrogen or methyl, and more preferably hydrogen.

q is an integer of 5 or more, preferably 5 to 12, and more preferably 6.

Exemplified embodiments of the polymer having a polysilane skeleton include the following.

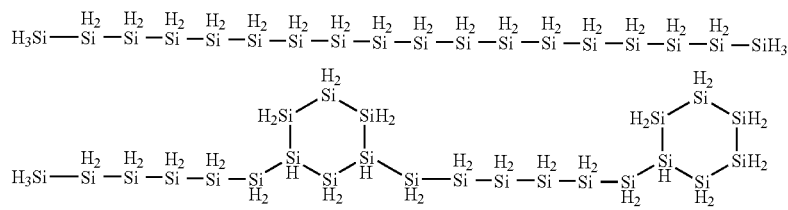

It is also one preferred embodiment of the present invention that the polymer having a polysilane skeleton does not have any Si—C bond. By not having any Si—C bond, etching with an alkaline solution becomes easier after forming a film, and processability can be improved.

The mass average molecular weight of the polymer having a polysilane skeleton is preferably 500 to 20,000, more preferably 1,000 to 15,000, for reasons of solubility in a solvent, planarity of the formed film, and adhesion to a substrate. The mass average molecular weight is a mass average molecular weight in terms of polystyrene, and can be measured by the gel permeation chromatography based on polystyrene.

The polymer having a polysilane skeleton is preferably a polymer of a polysilane compound comprising 5 or more of silicon (hereinafter, sometimes referred to as the polysilane compound). In a preferred embodiment, the polymer having a polysilane skeleton is formed by polymerizing the polysilane compound by light irradiation and/or heating.

The number of silicon atoms contained in the polysilane compound is preferably 5 to 8, and more preferably 5 or 6. The polysilane compound may be an inorganic compound or an organic compound, and may have a linear, branched or partially cyclic structure.

The polysilane compound may be one kind or a mixture of two or more kinds, preferably comprising a cyclic polysilane, and more preferably composed of a cyclic polysilane.

The cyclic polysilane is preferably represented by the following formula (ib').

wherein $R^{b'}$ is each independently hydrogen, halogen, $C_{1-6}$ alkyl, $C_{6-10}$ aryl or $-SiR^{B'}_3$ (where $R^{B'}$ is each independently hydrogen or $C_{1-8}$ alkyl, preferably hydrogen or methyl, and more preferably hydrogen), preferably hydrogen or silyl, and more preferably hydrogen.

$q'$ is an integer of 5 or more, preferably 5 to 8, and more preferably 5 or 6.

The cyclic polysilane is preferably at least one selected from the group consisting of silylcyclopentasilane, silylcyclohexasilane, disilylcyclohexasilane, cyclopentasilane and cyclohexasilane, and is more preferably cyclohexasilane and cyclopentasilane.

The polysilane compound may contain linear or branched polysilane, and examples of the linear or branched polysilane include neopentasilane, hexasilane, 3-silylpentasilane, 2,2-disilyltetrasilane, heptasilane, tetrasilyltetrasilane and hexasilylpentasilane. It is one preferred embodiment of the present invention that at least one of these are contained.

The above polysilane compound is preferably polymerized by light irradiation and/or heating, and more preferably by light irradiation.

In the case of light irradiation, the peak wavelength is preferably 248 to 436 nm, more preferably 282 to 405 nm. The irradiation intensity is preferably 10 to 250 mW/cm², more preferably 50 to 150 mW/cm², and the irradiation time is preferably 30 to 300 seconds, more preferably 50 to 200 seconds.

In the case of heating, it is preferable to conduct at 40 to 200° C. for 3 to 300 minutes.

It is also preferable to combine the above light irradiation and heating. It is assumed that when the polysilane compound contains a cyclic polysilane, a part or all of the cyclic polysilane is ring-opened by light irradiation and/or heating in this step. A cyclic polysilane structure that is not ring-opened may be contained in the polymer having a polysilane skeleton.

(II) Carbodiimide Compound

The composition according to the present invention comprises a carbodiimide compound represented by the formula (ii) (hereinafter, sometimes referred to as the carbodiimide compound).

By containing the carbodiimide compound in the composition according to the present invention, the coatability and adhesion to the substrate can be improved. Although this is not wishing to be bound by theory, it is assumed that by the interaction between the carbodiimide compound and the polymer having a polysilane skeleton, the surface tension of the composition is decreased, thereby improving the coatability, and further, by the interaction between the carbodiimide compound and the hydroxyl group on the substrate surface, thereby improving the adhesion.

It is also possible to improve the planarity of the formed silicon-containing film. In the coating film, among the polymer having a polysilane skeleton, some have a low molecular weight, but when the coating film is heated, it is assumed that one having low molecular weight may scatter from the film surface, sometimes causing unevenness on the film surface. Although not wishing to be bound by theory, it is assumed that by including the carbodiimide compound, scattering of the polymer is suppressed, thereby improving the planarity of the film surface. It is assumed that the carbodiimide compound also contributes to suppressing the film shrinkage by the same action during heating.

The formula (ii) is as follows.

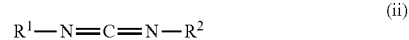

wherein $R^1$ and $R^2$ are each independently hydrogen, a mono- to trivalent, $C_{1-30}$, linear, branched or cyclic, saturated or unsaturated aliphatic hydrocarbon group, a mono- to trivalent, $C_{6-30}$ aromatic hydrocarbon group, or $-SiR^z_3$ (where $R^z$ is each independently a mono- or divalent, $C_{1-8}$ aliphatic hydrocarbon group), where $R^1$ and $R^2$ can be bonded each other to form a ring structure.

Preferably, $R^1$ and $R^2$ are each independently $C_{1-10}$ alkyl, $C_{6-10}$ aryl or $-SiR^z_3$ (where $R^z$ is each independently $C_{1-8}$ alkyl, preferably methyl).

More preferably, $R^1$ and $R^2$ are methyl, ethyl, isopropyl, tert-butyl, cyclohexyl, phenyl, tolyl, isopropylphenyl and trimethylsilyl.

Exemplified embodiments of the carbodiimide compound include di(o-tolyl)carbodiimide, N,N'-di-phenylcarbodiimide, N,N'-di-2,6-dimethylphenyl-carbodiimide, N,N'-bis(2,6-diisopropylphenyl)-carbodiimide, N,N'-dicyclohexylcarbodiimide, N,N'-diisopropylcarbodiimide, N-tert-butyl-N'-ethyl-carbodiimide, N,N'-di-tert-butylcarbodiimide, and N,N'-bis(trimethylsilyl)carbodiimide.

The molecular weight of the carbodiimide compound is preferably 100 to 600, and more preferably 100 to 400.

(III) Solvent

The composition according to the present invention comprises a solvent. The solvent is selected from those which uniformly dissolve or disperse each component contained in the composition. Exemplified embodiments of the solvent include ethylene glycol monoalkyl ethers, such as ethylene glycol monomethyl ether, ethylene glycol monoethyl ether, ethylene glycol monopropyl ether and ethylene glycol monobutyl ether; diethylene glycol dialkyl ethers, such as diethylene glycol dimethyl ether, diethylene glycol diethyl ether, diethylene glycol dipropyl ether and diethylene glycol dibutyl ether; ethylene glycol alkyl ether acetates, such as methyl cellosolve acetate and ethyl cellosolve acetate; propylene glycol monoalkyl ethers, such as propylene glycol monomethyl ether (PGME) and propylene glycol monoethyl ether; propylene glycol alkyl ether acetates such as propylene glycol monomethyl ether acetate (PGMEA), propylene glycol monoethyl ether acetate and propylene glycol monopropyl ether acetate; aromatic hydrocarbons, such as benzene, toluene, xylene and mesitylene; ketones, such as methyl ethyl ketone, acetone, methyl amyl ketone, methyl isobutyl ketone and cyclohexanone; alcohols, such as isopropanol and propanediol; and alicyclic hydrocarbons, such as cyclooctane and decalin. Preferred are cyclooctane, toluene, decalin and mesitylene.

These solvents can be used alone or in combination of two or more of any of these.

In order to homogeneously dissolve polysilane, the relative dielectric constant of the solvent is preferably 3.0 or less, more preferably 2.5 or less on the basis of the value described in "Solvent Handbook, 1st Edition", Kodansha Scientific.

Although the mixing ratio of the solvent varies depending on the coating method and the film thickness after coating, the ratio (solid content ratio) of the compounds other than the solvent is 1 to 96 mass %, and preferably 2 to 60 mass %.

The composition used in the present invention essentially comprises the above-mentioned (I) to (III), but further compounds can be combined, if necessary. The materials which can be combined are described below. The components other than (I) to (III) contained in the whole composition are preferably 10% or less, and more preferably 5% or less, based on the total mass.

(IV) Optional Component

In addition, the composition according to the present invention can contain an optional component, if needed. Examples of such an optional component include surfactants.

Surfactant is preferably used because it can improve the coatability. Examples of the surfactant include nonionic surfactants, anionic surfactants, amphoteric surfactants, and the like.

Examples of the nonionic surfactant include, polyoxyethylene alkyl ethers, such as polyoxyethylene lauryl ether, polyoxyethylene oleyl ether and polyoxyethylene cetyl ether; polyoxyethylene fatty acid diester; polyoxyethylene fatty acid monoester; polyoxyethylene polyoxypropylene block polymer; acetylene alcohol; acetylene glycols; acetylene alcohol derivatives, such as polyethoxylate of acetylene alcohol; acetylene glycol derivatives, such as polyethoxylate of acetylene glycol; fluorine-containing surfactants, for example, FLUORAD (trade name, manufactured by 3M Japan Limited), MEGAFACE (trade name: manufactured by DIC Cooperation), SURFLON (trade name, manufactured by AGC Inc.); or organosiloxane surfactants, for example, KP341 (trade name, manufactured by Shin-Etsu Chemical Co., Ltd.), and the like. Examples of said acetylene glycol include 3-methyl-1-butyne-3-ol, 3-methyl-1-pentyn-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol, 2,5-dimethyl-2,5-hexane-diol, and the like.

Further, examples of the anionic surfactant include ammonium salt or organic amine salt of alkyl diphenyl ether disulfonic acid, ammonium salt or organic amine salt of alkyl diphenyl ether sulfonic acid, ammonium salt or organic amine salt of alkyl benzene sulfonic acid, ammonium salt or organic amine salt of polyoxyethylene alkyl ether sulfuric acid, ammonium salt or organic amine salt of alkyl sulfuric acid, and the like.

Further, examples of the amphoteric surfactant include 2-alkyl-N-carboxymethyl-N-hydroxyethyl imidazolium betaine, lauric acid amide propyl hydroxysulfone betaine, and the like.

These surfactants can be used alone or in combination of two or more of any of these, and the mixing ratio thereof is usually 50 to 10,000 ppm, and preferably 100 to 5,000 ppm, based on the total mass of the composition.

<Method for Preparing a Silicon-Containing Film Forming Composition>

The method for preparing a silicon-containing film forming composition according to the present invention is not particularly limited.

When the polymer having a polysilane skeleton is a polymer of the cyclic polysilane containing 5 or more silicon, it is manufactured, for example, by a method comprising:

(A) a step of irradiating the cyclic polysilane containing 5 or more silicon with light, (B) a step of preparing a mixture comprising the carbodiimide compound used in the present invention, and (C) a step of irradiating the mixture with light.

Hereinafter, one example of the manufacturing method is described with respect to each step.

The wavelength of the step (A) preferably comprises a peak wavelength of at least 172 to 405 nm, and more preferably 282 to 405 nm. The irradiation intensity is preferably 10 to 250 mW/cm$^2$, more preferably 50 to 150 mW/cm$^2$, and the irradiation time is preferably 30 to 300 seconds, more preferably 50 to 200 seconds.

Since cyclopentasilane or cyclohexasilane is liquid at room temperature, the cyclic polysilane in a liquid state can be irradiated with light while stirring. In addition, when the cyclic polysilane is a solid, it can be dissolved in any appropriate solvent and irradiated with light while stirring.

It is assumed that a part or all of the cyclic polysilane is ring-opened by the light irradiation in this step.

(B) Step of Preparing a Mixture Comprising the Carbodiimide Compound used in the Present Invention When the cyclic polysilane irradiated with light is in a liquid state at room temperature, the above-mentioned carbodiimide compound is added thereto and stirred, thereby preparing a mixture. In addition, when the cyclic polysilane irradiated with light is a solid, it can be dissolved in an appropriate solvent. It is also possible that the carbodiimide compound is dissolved in an appropriate solvent, then added to the cyclic polysilane irradiated with light, and stirred, thereby preparing a mixture.

(C) Step of Irradiating the Mixture with Light

It is assumed that by the light irradiation in this step, condensation of each polysilane is caused to form a polymer having a polysilane skeleton.

The exposure wavelength at this time preferably comprises a peak wavelength of at least 172 to 405 nm, and more preferably 282 to 405 nm. The irradiation intensity is preferably 10 to 250 mW/cm$^2$, more preferably 50 to 150 mW/cm$^2$, and the irradiation time is preferably 5 to 100 minutes, more preferably 5 to 60 minutes. The irradiation energy is preferably 3 to 1,500 J, more preferably 25 to 500 J. In addition, the order of the steps (B) and (C) may be reversed. That is, after the step (A), the light irradiation described in the step (C) may be performed, and then the carbodiimide compound may be added to prepare a mixture.

The above steps (A), (B) and (C) are preferably performed in a non-oxidizing atmosphere.

The solvent may be added in the step (A) or (B) as described above, or may be added after the step (C). It is preferable that the above-mentioned optional component is added after the step (C).

<Method for Manufacturing a Silicon-Containing Film>

The method for manufacturing a silicon-containing film according to the present invention comprises:

applying the above-mentioned silicon-containing film forming composition above a substrate to form a coating film; and heating the coating film.

In the present invention, "above a substrate" includes a case where the composition is directly applied on a substrate and a case where the composition is applied on a substrate via one or more intermediate layers.

The coating method can be freely selected from conventionally known methods such as spin coating method, dip method, spray method, transfer method, inkjet method, roll coating, bar coating, brush coating, doctor coating, flow coating, and slit coating. Further, as the substrate to which the composition is applied, an appropriate substrate such as a silicon substrate, a glass substrate, or a resin film can be used. Various kinds of semiconductor device and the like may be formed on these substrates, if necessary. If the substrate is a film, gravure coating is also available. If desired, a drying step may be separately set up after forming the coating film. Further, the coating step may be repeated once, twice, or more as needed to obtain a desired film thickness of the coating film.

After forming a coating film using the composition according to the present invention, the coating film may be prebaked (heat-treated) for the purpose of drying the coating film and decreasing the residual amount of the solvent.

The prebaking step can be conducted in an oxidizing or a non-oxidizing atmosphere, preferably at a temperature of 50 to 400° C., for 10 seconds to 60 minutes in a case of a hot plate and for 1 to 120 minutes in a case of a clean oven.

After forming a coating film using the composition according to the present invention, the coating film can be irradiated with light before heating for curing. The light irradiation is performed by irradiates light having a peak wavelength of preferably 248 to 436 nm, more preferably 248 to 405 nm. The irradiation intensity is preferably 10 to 800 mW/cm$^2$, more preferably 40 to 600 mW/cm$^2$, and the irradiation time is preferably 30 to 3,500 seconds, more preferably 50 to 3,000 seconds.

Then, the coating film, which is prebaked and/or light-irradiated, if necessary, is heated and cured in a non-oxidizing atmosphere, an oxidizing atmosphere and/or an ammonia atmosphere, thereby forming a silicon-containing film. The heating temperature is preferably 200 to 1,000° C., more preferably 300° C. or higher. The heating time is not particularly limited, and is generally 10 minutes to 24 hours. Flash annealing can be used for the heating. Normally, it takes several seconds to several hours until a patterned film reaches a desired temperature from the temperature before heating.

The non-oxidizing atmosphere means an atmosphere having an oxygen concentration of 1 ppm or less and a dew point of −76° C. or lower. Preferably, a gas atmosphere of $N_2$, Ar, He, Ne, $H_2$, or a mixture of two or more of any of these is used.

The oxidizing atmosphere means that the oxygen partial pressure is 20 to 101 kPa, preferably 40 to 101 kPa, and more preferably 1.5 to 80 kPa of steam partial pressure is contained, when the total pressure is 101 kPa.

In addition, when the heating is performed at high temperature (for example, a temperature exceeding 600° C.) in an atmosphere containing steam, there is a concern that the other elements would be adversely affected if other elements such as electronic devices are exposed to the heat treatment at the same time. In such a case, this heating step can be divided into two or more steps (more preferably three or more steps). For example, the coating film is heated first in a steam-containing atmosphere at low temperature (for example, in a temperature range of 200 to 400° C.), then heated in a steam-containing atmosphere at relatively low temperature (for example, in a temperature range of 300 to 600° C.), and heated at high temperature (for example, in a temperature range of 400 to 800° C.) in a steam-free atmosphere.

Any gas can be used as a component other than steam (hereinafter, sometimes referred to as the dilution gas) in an atmosphere containing steam, and examples thereof include air, oxygen, nitrogen, nitrogen oxide, ozone, helium and argon. Considering the film quality of the silicon-containing film, it is preferable to use oxygen as the dilution gas.

The ammonia atmosphere means that the ammonia partial pressure is 20 to 101 kPa, preferably 25 to 80 kPa, when the total pressure is 101 kPa.

The silicon-containing film according to the present invention can be made into an amorphous silicon film by heating in a non-oxidizing atmosphere. The cured film is an amorphous silicon film, which is confirmed with no diffraction peak corresponding to a crystalline Si observed by X-ray diffraction (XRD).

The silicon-containing film according to the present invention can be made into a siliceous film by heating in an oxidizing atmosphere. In the present invention, the siliceous film means a film comprising oxygen atoms and silicon atoms, which have a ratio of the number of oxygen atoms to the number of silicon atoms (O/Si) of 1.20 to 2.50, preferably 1.40 to 2.50, and more preferably 1.60 to 2.45. The siliceous film can contain other atoms such as hydrogen, nitrogen and carbon.

The silicon-containing film according to the present invention can be made into a silicon nitride film by heating in an ammonia atmosphere. In the present invention, the silicon nitride film is a film in which the ratio of the number of nitrogen atoms to the number of silicon atoms (N/Si) is 0.2 to 2.0, and preferably 0.4 to 1.6. The silicon nitride film can contain other atoms such as hydrogen and oxygen.

The film thickness of the formed silicon-containing film is not particularly limited, but is preferably 20 to 500 nm, and more preferably 20 to 300 nm.

A silicon-containing film having high planarity can be formed by using the composition according to the present invention. The formed silicon-containing film has a low diffuse reflectance. In particular, the relative diffuse reflectance measured using barium sulfate as a standard plate at a light incident angle of 0° at a wavelength of 400 nm is preferably 1% or less, and more preferably 0.5% or less. The relative diffuse reflectance can be measured, for example, by installing an integrating sphere attachment ISR-2600Plus (Shimadzu Corporation) to a spectrophotometer UV-2600 (Shimadzu Corporation).

Further, the method for manufacturing an electronic device according to the present invention comprises the above-mentioned manufacturing method. Preferably, the electronic device according to the present invention is a semiconductor device, a solar cell chip, an organic light emitting diode, or an inorganic light emitting diode. A preferred embodiment of the electronic device of the present invention is a semiconductor device.

Hereinafter, the present invention is explained with reference to Examples. These Examples are for explanation and are not intended to limit the scope of the present invention.

The steps of synthesizing the polysilane and preparing the composition in the following Examples and Comparative Examples are all conducted in a glove box controlled to have an oxygen concentration of 0.1 ppm or less and a dew point temperature of −76.0° C. or lower under a nitrogen gas atmosphere.

Example 1

A stirrer tip is placed in a 6 mL screw tube, and 250 mg of cyclohexasilane is added thereto and stirred using a stirrer. 8.5 J/cm$^2$ of ultraviolet ray having a peak wavelength of 365 nm using a LED lamp as a light source is irradiated. After the ultraviolet ray irradiation, 13.28 mg of bis(trimethylsilyl)carbodiimide is added thereto and stirred using a stirrer. While continuing to stir, 14.8 J/cm$^2$ of ultraviolet ray having a peak wavelength of 365 nm using a LED lamp as a light source is irradiated to form a polymer A having a polysilane skeleton. After the ultraviolet ray irradiation, 1,938 mg of cyclooctane is added and stirred for 3 minutes, and filtration is conducted using a 0.2 μm PTFE filter (DISMIC-13JP, manufactured by Advantec) to prepare a composition of Example 1.

The mass average molecular weight of the polymer A having a polysilane skeleton is 2,800. The mass average molecular weight (Mw) is measured by the gel permeation chromatography (GPC) based on polystyrene. GPC is measured using Alliance (trademark) e2695 type high-speed GPC system (Japan Waters K.K.) and a GPC column for organic solvent, Shodex KF-805L (Showa Denko K.K.). The measurement is conducted using monodispersed polystyrene as a standard sample and cyclohexene as a developing solvent, under the measuring conditions of a flow rate of 0.6 ml/min and a column temperature of 40° C., and then Mw is calculated as a relative molecular weight to the standard sample.

Examples 2 to 7, Comparative Examples 1 and 2

The compositions of Examples 2 to 7 and Comparative Examples 1 and 2 are prepared in the same manner as in Example 1 except that the components and conditions shown in Table 1 are used. In Comparative Example 2, 3-aminopropyltriethoxysilane is used instead of the carbodiimide compound.

The Mw of the obtained polymer having a polysilane skeleton is measured in the same manner as above, and the results are described in Table 1.

TABLE 1

| | (I) Polymer having a polysilane skeleton | | | | | | (II) Carbodiimide Compound | | (III) Solvent | |
|---|---|---|---|---|---|---|---|---|---|---|
| | Polysilane Compound | | Ultraviolet ray irradiation 1st | | Ultraviolet ray irradiation 2nd | | Mw | | | |
| Example 1 | Cyclohexasilane | 250 mg | 365 nm (LED) | 8.5 J/cm$^2$ | 365 nm (LED) | 14.8 J/cm$^2$ | 2,800 | Bis(trimehyl-silyl)carbodiimide | 13.28 mg | Cyclooctane | 1938 mg |
| Example 2 | Cyclohexasilane | 250 mg | 365 nm (LED) | 8.5 J/cm$^2$ | 365 nm (LED) | 22.2 J/cm$^2$ | 5,470 | Bis(trimehyl-silyl)carbodiimide | 13.28 mg | Cyclooctane | 1938 mg |
| Example 3 | Cyclohexasilane | 250 mg | 365 nm (LED) | 8.5 J/cm$^2$ | 365 nm (LED) | 14.8 J/cm$^2$ | 3,920 | Bis(trimehyl-silyl)carbodiimide | 64.74 mg | Cyclooctane | 1349 mg |
| Example 4 | Cyclohexasilane | 250 mg | 365 nm (LED) | 8.5 J/cm$^2$ | 365 nm (LED) | 14.8 J/cm$^2$ | 2,910 | N,N'-diisopropyl-carbodiimide | 13.12 mg | Cyclooctane | 1938 mg |
| Example 5 | Cyclohexasilane | 250 mg | 365 nm (LED) | 8.5 J/cm$^2$ | 365 nm (LED) | 14.8 J/cm$^2$ | 2,880 | Bis(trimehyl-silyl)carbodiimide | 13.28 mg | Cyclooctane | 1938 mg |
| Example 6 | Cyclohexasilane | 250 mg | 365 nm (LED) | 8.5 J/cm$^2$ | 365 nm (LED) | 14.8 J/cm$^2$ | 3,030 | N,N'-diisopropyl-carbodiimide | 13.12 mg | Cyclooctane | 1938 mg |
| Example 7 | Cyclohexasilane | 250 mg | 365 nm (LED) | 8.5 J/cm$^2$ | 365 nm (LED) | 14.8 J/cm$^2$ | 2,770 | Bis(trimehyl-silyl)carbodiimide | 13.28 mg | Cyclooctane | 1938 mg |
| Comparative Example 1 | Cyclohexasilane | 272 mg | 365 nm (LED) | 8.6 J/cm$^2$ | 365 nm (LED) | 98.4 J/cm$^2$ | 8,270 | — | — | Cyclooctane | 1920 mg |
| Comparative Example 2 | Cyclohexasilane | 250 mg | 365 nm (LED) | 8.5 J/cm$^2$ | 365 nm (LED) | 14.8 J/cm$^2$ | 2,350 | 3-aminopropyl-triethoxysilane | 13.28 mg | Cyclooctane | 1938 mg |

Formation of a Silicon-Containing Film

The composition of Example 1 prepared above is applied on a Si substrate in a nitrogen atmosphere using a spin coater to form a coating film. The obtained coating film is heated on a hot plate at 400° C. for 15 minutes in a nitrogen atmosphere to obtain a silicon-containing film.

Using the compositions of Examples 2 to 7 and Comparative Examples 1 and 2 prepared above, silicon-containing films are obtained in the same manner as above, except that the heating conditions are changed to the conditions described in Table 2. Regarding Example 5, 18 J/cm$^2$ of light having a peak wavelength of 405 nm is irradiated after the formation of the coating film and subsequently heating is conducted.

Using the compositions of Examples 1 to 5 and Comparative Examples 1 and 2, measurement of the FT-IR spectrum of the silicon-containing film formed is conducted at room temperature using FTIR-6100 (JASCO Corporation), and it is confirmed that the obtained silicon-containing film is an amorphous silicon film.

[Relative Diffuse Reflectance]

Regarding the obtained silicon-containing film, installing an integrating sphere attachment ISR-2600Plus (Shimadzu Corporation) to a spectrophotometer UV-2600 (Shimadzu Corporation), and the relative diffuse reflectance (%) when light having a wavelength of 400 nm is incident from the silicon-containing film side (incident light 0°) is measured using barium sulfate as a standard plate and taking the standard plate as 100%. The results obtained are described in Table 2.

TABLE 2

|  | Heating Condition | Film Thickness (nm) | Refractive Index @633 nm | Relative Diffuse Reflectance @400 nm (%) |
| --- | --- | --- | --- | --- |
| Example 1 | Nitrogen atmosphere 400° C. 15 minutes | 86 | 3.64 | 0.45 |
| Example 2 | Nitrogen atmosphere 400° C. 15 minutes | 89 | 3.58 | 0.20 |
| Example 3 | Nitrogen atmosphere 400° C. 15 minutes | 100 | 3.64 | 0.19 |
| Example 4 | Nitrogen atmosphere 400° C. 15 minutes | 73 | 3.53 | 0.27 |
| Example 5 | After 18 J/cm2 of light having a peak wavelength of 405 nml, Nitrogen atmosphere 400° C. 15 minutes | 116 | 3.62 | 0.20 |
| Example 6 | Steam atmosphere 400° C. 15 minutes | 136 | 1.46 | 0.28 |
| Example 7 | Ammonia atmosphere 400° C. 15 minutes | 92 | 1.85 | 0.34 |
| Comparative Example 1 | Nitrogen atmosphere 400° C. 15 minutes | 60 | 3.44 | 2.02 |
| Comparative Example 2 | Nitrogen atmosphere 400° C. 15 minutes | 41 | 3.41 | 2.83 |

In the case of using the composition of Example 6, it is confirmed by the measurement of the FT-IR spectrum that the obtained silicon-containing film is a siliceous film.

In the case of using the composition of Example 7, it is confirmed by the measurement of the FT-IR spectrum that the obtained silicon-containing film is a silicon nitride film.

When the compositions of Examples 1 to 7 are used, the coatability is good, a coating film can be uniformly formed on a substrate, and a uniform silicon-containing film can be formed without peeling from the substrate even during heating. On the other hand, when the composition of Comparative Example 1 is used, it can be applied on the entire substrate, but shrinking of the coating film in the plane direction is caused at the time of heating and the silicon-containing film is not formed as a whole. In the further measurement for Comparative Example 1, it is conducted by selecting the portion where the silicon-containing film is formed.

[Film Thickness]

The film thickness of the obtained silicon-containing film is measured using a spectroscopic ellipsometer M-2000V (J.A. Woollam). For the film thickness, it is measured at 8 points excluding the central part on the wafer, and the average value thereof is used as the film thickness. The results obtained are described in Table 2.

[Refractive Index]

The refractive index of the obtained silicon-containing film is measured at a wavelength of 633 nm using a spectroscopic ellipsometer M-2000V (J.A. Woollam). The results obtained are described in Table 2.

The invention claimed is:

1. A silicon-containing film forming composition comprising:

(I) a polymer having a polysilane skeleton comprising a repeating unit represented by the formula (ia):

wherein $R^a$ is each independently a single bond, hydrogen, halogen, $C_{1-6}$ alkyl, $C_{6-10}$ aryl or —$SiR^4_3$ (where $R^4$ is each independently hydrogen or $C_{1-8}$ alkyl), and p is an integer of 5 or more;

(II) a carbodiimide compound represented by the formula (ii):

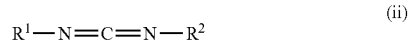

wherein $R^1$ and $R^2$ are each independently hydrogen, a mono- to trivalent, $C_{1-30}$, linear, branched or cyclic, saturated or unsaturated aliphatic hydrocarbon group, a mono- to trivalent, $C_{6-30}$ aromatic hydrocarbon group, or —SiR$^z_3$ (where R$^z$ is each independently a mono- or divalent, C$_{1-8}$ aliphatic hydrocarbon group), where R$^1$ and R$^2$ can be bonded each other to form a ring structure; and (III) a solvent.

2. The composition according to claim 1, wherein the polymer further comprises a repeating unit represented by the formula (ib):

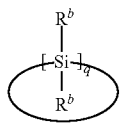
(ib)

wherein

R$^b$ is each independently a single bond, hydrogen, halogen, C$_{1-6}$ alkyl, C$_{6-10}$ aryl or —SiR$^B_3$ (where R$^B$ is each independently hydrogen or C$_{1-8}$ alkyl), provided that at least one of R$^b$ is a single bond, and q is an integer of 5 or more.

3. The composition according to claim 1, wherein R$^1$ and R$^2$ are each independently C$_{1-10}$ alkyl, C$_{6-10}$ aryl or —SiR$^z_3$ (where R$^z$ is each independently C$_{1-8}$ alkyl).

4. The composition according to claim 1, wherein the carbodiimide compound is at least one selected from the group consisting of di(o-tolyl)carbodiimide, N,N'-diphenylcarbodiimide, N,N'-di-2,6-dimethylphenyl-carbodiimide, N,N'-bis(2,6-diisopropylphenyl)carbodiimide, N,N'-dicyclohexylcarbodiimide, N,N'-diisopropylcarbodiimide, N-tert-butyl-N'-ethyl-carbodiimide, N,N'-di-tert-butylcarbodiimide and N,N'-bis(trimethylsilyl)carbodiimide.

5. The composition according to claim 1, wherein the relative dielectric constant of the solvent is 3.0 or less.

6. The composition according to claim 1, wherein the polymer having a polysilane skeleton is a polymer of a polysilane compound comprising 5 or more silicon.

7. The composition according to claim 6, wherein the polysilane compound comprises a cyclic polysilane.

8. The composition according to claim 7, wherein the cyclic polysilane is represented by the following formula (ib'),

(ib')

wherein

R$^{b\prime}$ is each independently hydrogen, halogen, C$_{1-6}$ alkyl, C$_{6-10}$ aryl or —SiR$^{B\prime}_3$ (where R$^{B\prime}$ is each independently hydrogen or C$_{1-8}$ alkyl), and q' is an integer of 5 or more.

9. The composition according to claim 7, wherein the cyclic polysilane is at least one selected from the group consisting of silylcyclopentasilane, silylcyclohexasilane, disilylcyclohexasilane, cyclopentasilane and cyclohexasilane.

10. The composition according to claim 6, wherein the polysilane compound is at least one selected from the group consisting of neopentasilane, hexasilane, 3-silylpentasilane, 2,2-disilyltetrasilane, heptasilane, tetrasilyltetrasilane and hexasilylpentasilane.

11. A method for manufacturing a silicon-containing film comprising:

applying the composition according to claim 1 above a substrate to form a coating film, and heating the coating film.

12. The method according to claim 11, comprising heating the coating film in a non-oxidizing atmosphere.

13. The method according to claim 11, comprising heating the coating film in an oxidizing atmosphere.

14. The method according to claim 11, comprising heating the coating film in an ammonia atmosphere.

15. The method according to claim 11, wherein after forming the coating film, the coating film is irradiated with light having a peak wavelength of 248 to 436 nm.

16. The method according to claim 11, wherein the heating is performed at 200 to 1,000° C.

17. A method for manufacturing an electronic device, comprising the method according to claim 11.

* * * * *